United States Patent
Monzo et al.

(10) Patent No.: US 12,403,720 B2
(45) Date of Patent: Sep. 2, 2025

(54) MARKER PIXEL WICKING APPARATUS

(71) Applicant: Crayola LLC, Easton, PA (US)

(72) Inventors: Anthony P. Monzo, Easton, PA (US); Craig Skinner, Nazareth, PA (US)

(73) Assignee: Crayola LLC, Easton, PA (US)

( * ) Notice: Subject to any disclaimer, the term of this patent is extended or adjusted under 35 U.S.C. 154(b) by 925 days.

(21) Appl. No.: 17/557,543

(22) Filed: Dec. 21, 2021

(65) Prior Publication Data

US 2022/0227165 A1 Jul. 21, 2022

Related U.S. Application Data

(60) Provisional application No. 63/185,627, filed on May 7, 2021, provisional application No. 63/128,427, filed on Dec. 21, 2020.

(51) Int. Cl.
| | | |
|---|---|---|
| G09B 11/04 | (2006.01) | |
| B43K 8/06 | (2006.01) | |
| B44D 2/00 | (2006.01) | |

(52) U.S. Cl.
CPC ........... *B44D 2/002* (2013.01); *B43K 8/06* (2013.01); *G09B 11/04* (2013.01)

(58) Field of Classification Search
None
See application file for complete search history.

(56) References Cited

U.S. PATENT DOCUMENTS

| | | | |
|---|---|---|---|
| 4,212,393 A * | 7/1980 | Lenkoff | A63H 33/22 434/84 |
| 2018/0065265 A1* | 3/2018 | Volzer | B26D 1/04 |

FOREIGN PATENT DOCUMENTS

CN 203580428 U 5/2014

OTHER PUBLICATIONS

Product Information, ScrewFix, 2022, "Fix-O-Moll Natural Round Self-Adhesive Parquet Gliders", screwfix.com [online], Available from: (See Additional information) [Jan. 6, 2022] (2 pgs) See relevant figures https://www.screwfix.com/p/fix-o-moll-natural-round-self-adhesive-parquet-gliders-22-x-22mmm-16-pack/544KF?tc=GT8&ds_kid=92700048793290424&ds_4I=1249413&gclid=EAlalQobChMI9auHye6L-AIVC91RChliuQunEAkYBiABEgLtBvD_BwE&gclsrc=aw.ds.

Amazon Product Information, 2022, "Water Drawing Mat-Kids Aqua Water Doodle Mat Toy", Amazon.com, [online], Available from: https://www.amazon.co.uk/Water-Drawing-Mat-Kids-Doodle/dp/B07PCHQ1SY/ref=sr_1_1?crid=2B5CCVBCS3CAH&keywords=water+drawing+mat+-+kids+aqua+water+doodle+mat+toy&qid=1655997712&sprefix=water+drawing+mat+-+kids+aqua+water+doodle+mat+toy%2Caps%2C147&sr=8-1 [Accessed Jan. 6, 2022] (8 pgs).

Combined Search and Examination Report dated Jun. 9, 2022 received in related UK Patent Application GB2118687.9 filed on Dec. 21, 2021 (8 pgs).

* cited by examiner

Primary Examiner — James B Hull
(74) Attorney, Agent, or Firm — Stinson LLP

(57) ABSTRACT

The present disclosure is directed to a marker pixel wicking apparatus that allows a user to create dimensional pixelated art using a method of applying a colored ink marker directly onto the top white surface of a specifically designed substrate. The substrate has been molded specifically with an array of small vertical flat-topped cylinders covering nearly the entire surface.

23 Claims, 24 Drawing Sheets

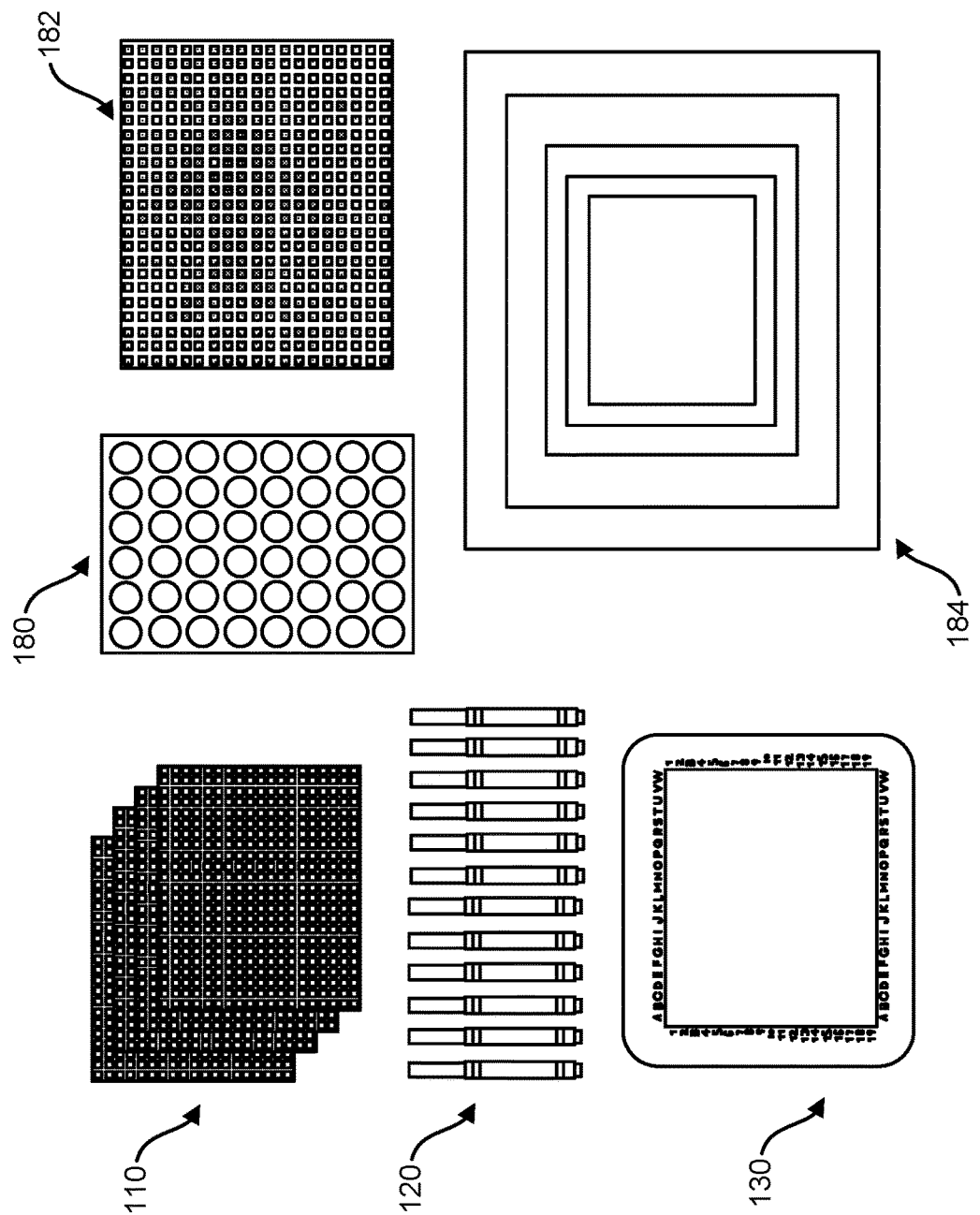

MARKER PIXEL WICKING APPARATUS

CROSS-REFERENCE TO RELATED APPLICATIONS

This application claims the benefit of U.S. Provisional Application No. 63/185,627, filed May 7, 2021 and U.S. Provisional Application No. 63/128,427, filed Dec. 21, 2020, the contents of each of which are incorporated herein by reference.

FIELD

The present disclosure is directed to a marker pixel wicking apparatus that allows users to create dimensional pixelated art using a method of applying colored ink from a marker directly onto a blank white surface featuring small vertical cylinders.

BACKGROUND

Blank coloring substrates provide a marking surface for users to create limitless marker artwork, but do not provide boundaries for guiding marker ink application for segmented or pixelated art effects.

SUMMARY

The present disclosure is directed to a marker pixel wicking apparatus that allows a user to create pixelated art using a simple method of applying safe marker ink onto a specially designed 3D surface. The user will not need to use heat while being supervised by an adult as most competitive products require.

Also provided herein is system for creating pixelated marker art using a porous substrate and frame structure and any number of fluid ink marking instruments.

The present disclosure is also directed to method for creating pixelated artwork on a prepared substrate where a user contacts a fibrous nib of a marking device against a fibrous protrusion on a pixelated substrate. The pixelated substrate may also be secured within a pixel frame structure that further isolates individual porous segments of the underlying substrate.

More specifically, the present disclosure is directed to a marker wicking apparatus comprising a planar base made from a first material, at least one wicking protrusion extending outward from the planar base, the at least one wicking protrusion being made from a second material, the at least one wicking protrusion comprising a wicking surface; wherein the first material and the second material may be the same or different; and wherein a wicking ability of the first material is less than a wicking ability of the second material.

A further aspect of the present disclosure is a marker wicking apparatus comprising a hydrophobic base; and a plurality of hydrophilic columnar wicking posts coupled to and extending upward from the hydrophobic base, the wicking posts configured to receive and wick a donor solution throughout the post, wherein the hydrophobic base is configured to resist wicking the donor solution wicked through the wicking post.

Other objects and features will be in part apparent and in part pointed out hereinafter.

BRIEF DESCRIPTION OF THE DRAWINGS

FIG. 18 is an exemplary kit containing porous marker wicking apparatuses of FIG. 7, adhesive, image guide, markers, an art guide of FIG. 15A and matte framing.

Corresponding reference characters indicate corresponding parts throughout the drawings.

DETAILED DESCRIPTION

Figure 1:
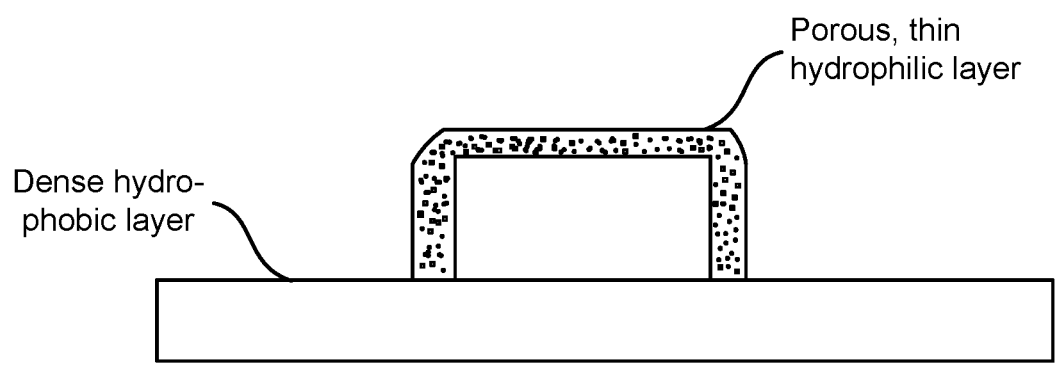
FIG. 1 is a cross-sectional view of one pixel of an embodiment of the marker pixel wicking apparatus.
Figure 2A:
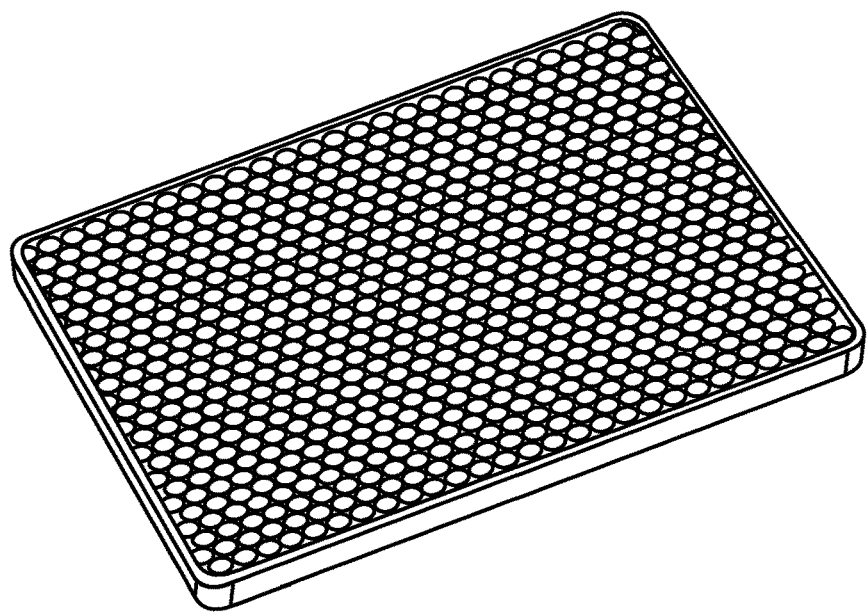
FIG. 2A is a perspective view of the marker pixel wicking apparatus with cylindrical columns.
Figure 2B:
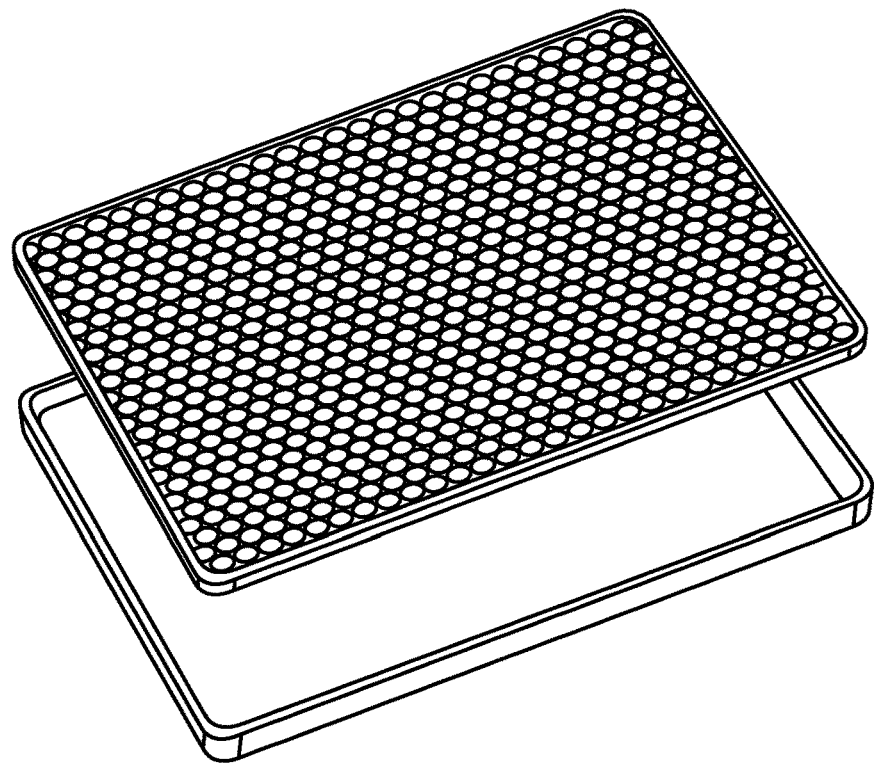
FIG. 2B is an exploded perspective view of the marker pixel wicking apparatus of FIG. 2A.
Figure 3A:
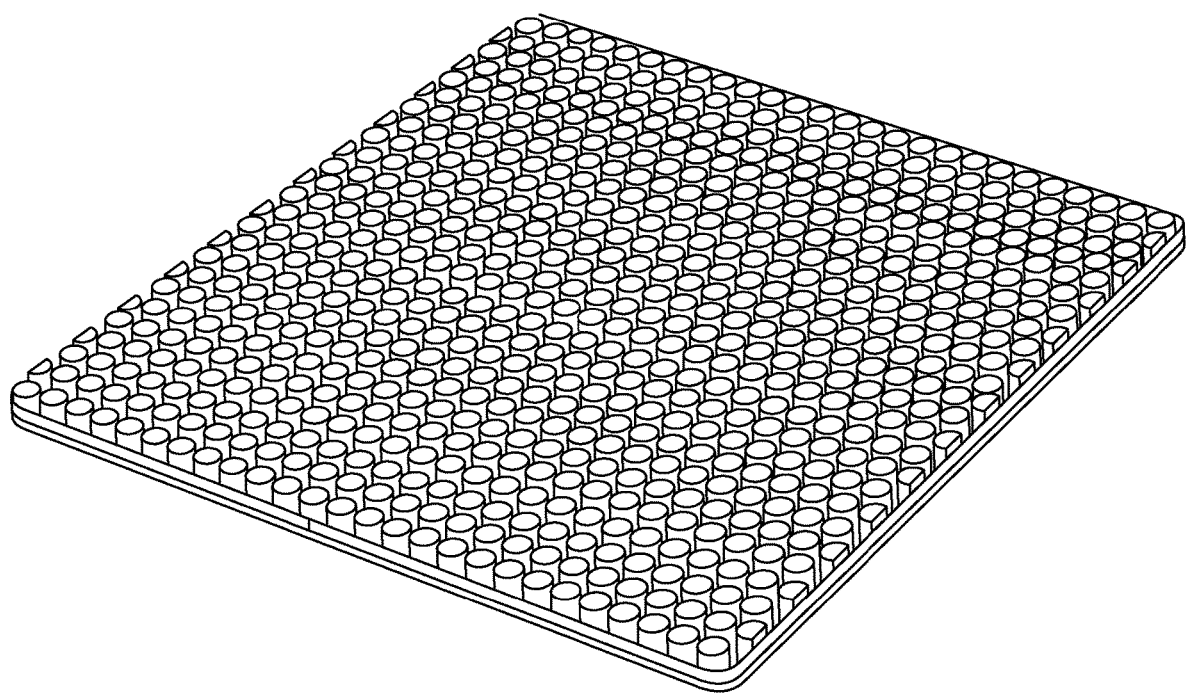
FIG. 3A is a perspective view of a marker pixel wicking apparatus without an outside frame.
Figure 3B:
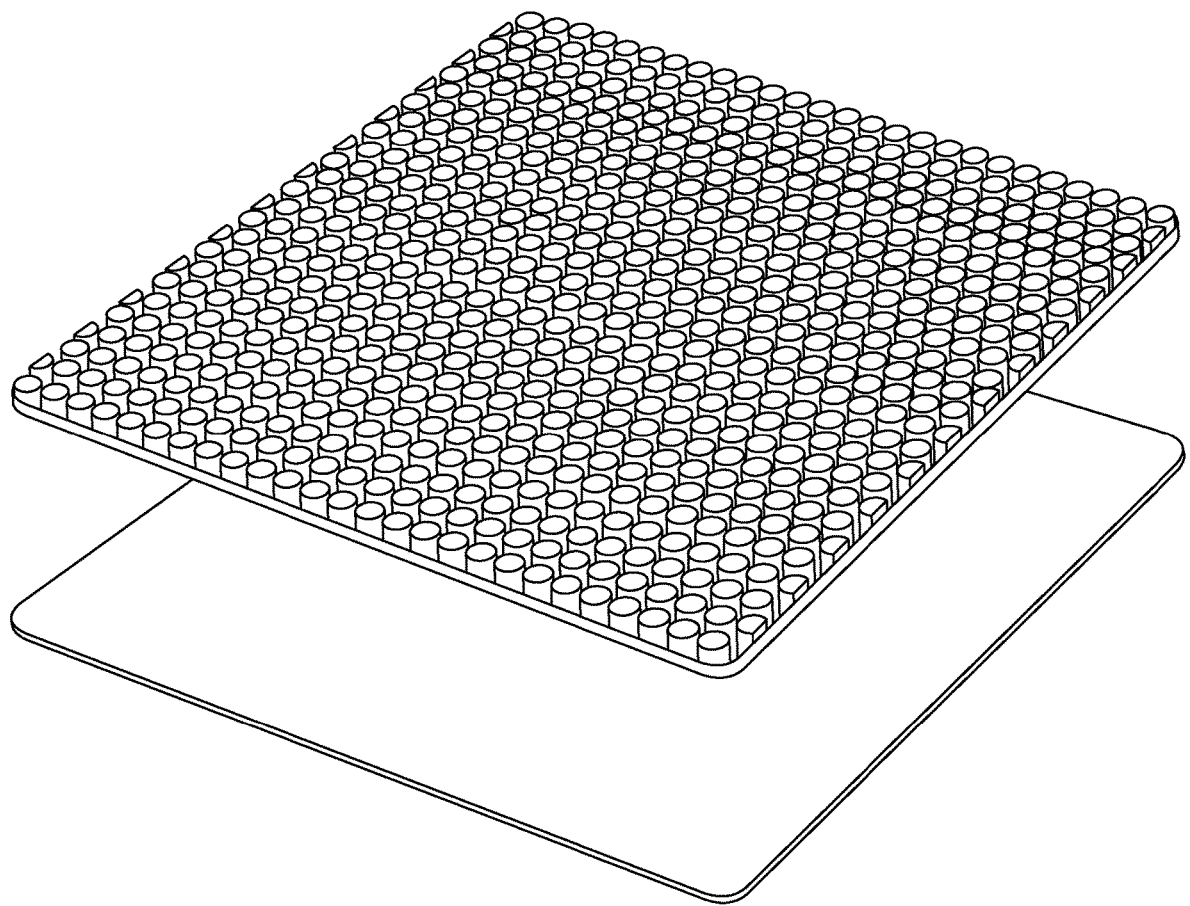
FIG. 3B is an exploded perspective view of the marker pixel wicking apparatus of FIG. 3A.
Figure 4:
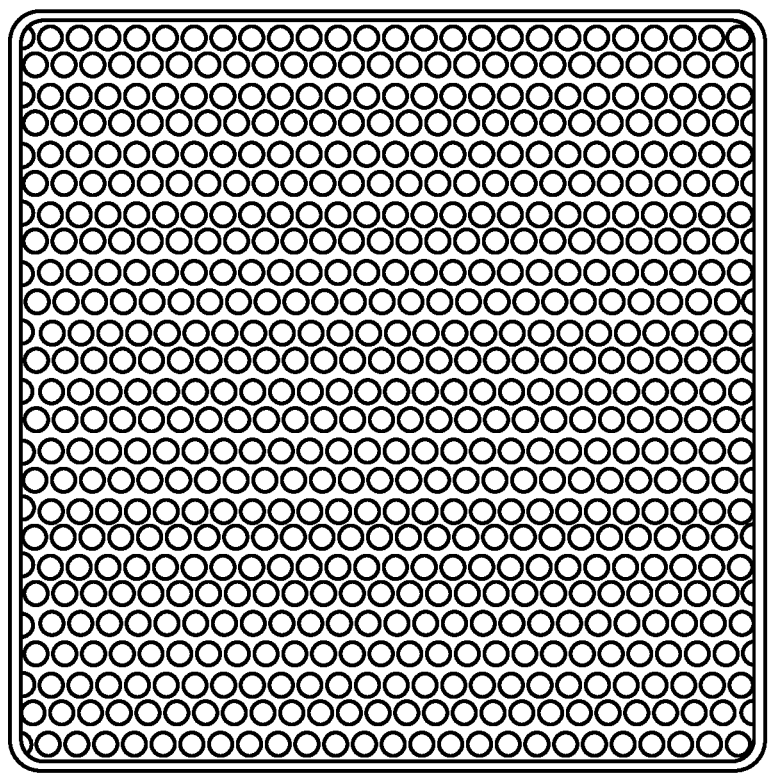
FIG. 4 is a top view of an embodiment of the marker pixel wicking apparatus.
Figure 5A:
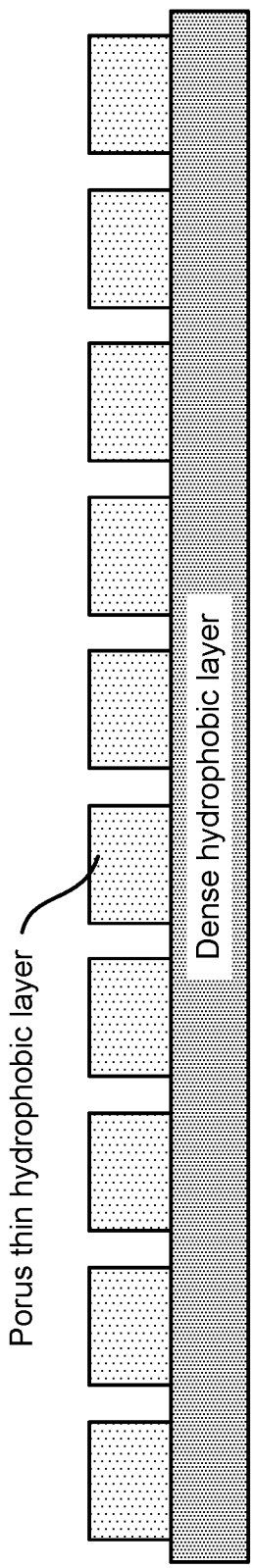
FIG. 5A is a side view of an embodiment of the wicking apparatus.
Figure 5B:
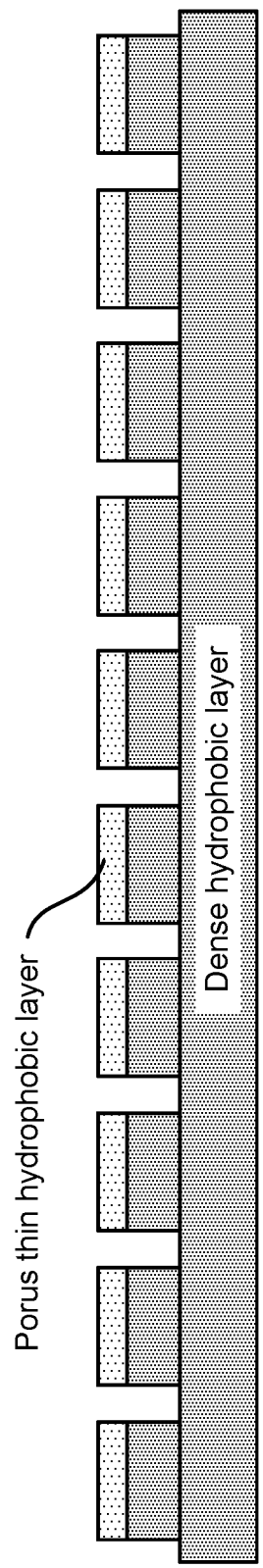
FIG. 5B is a side view of another embodiment of the wicking apparatus.
Figure 6A:
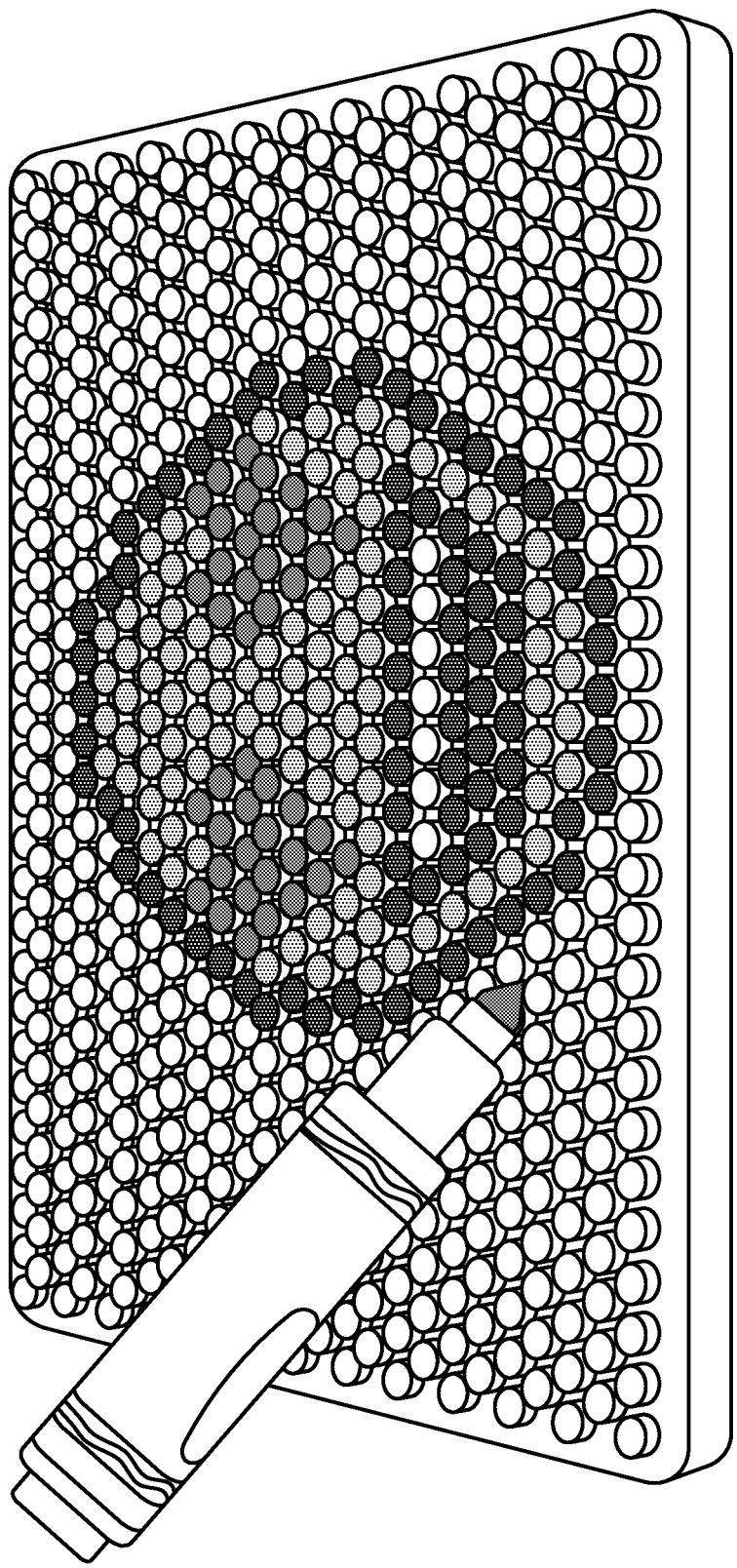
FIG. 6A is a top perspective view of a wicking apparatus with a frame structure and artwork.
Figure 6B:
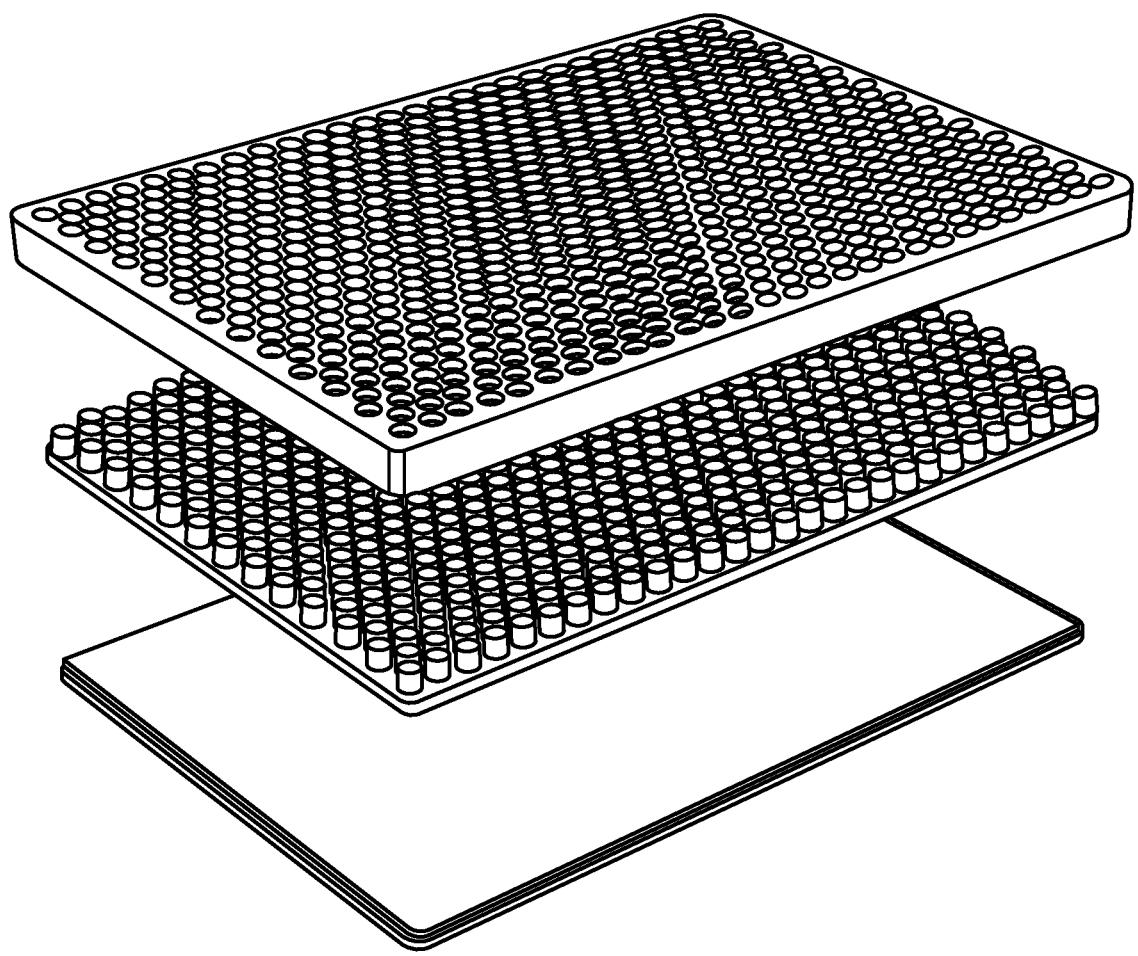
FIG. 6B is an exploded perspective view of the wicking apparatus and frame structure of FIG. 6A.
Figure 7:
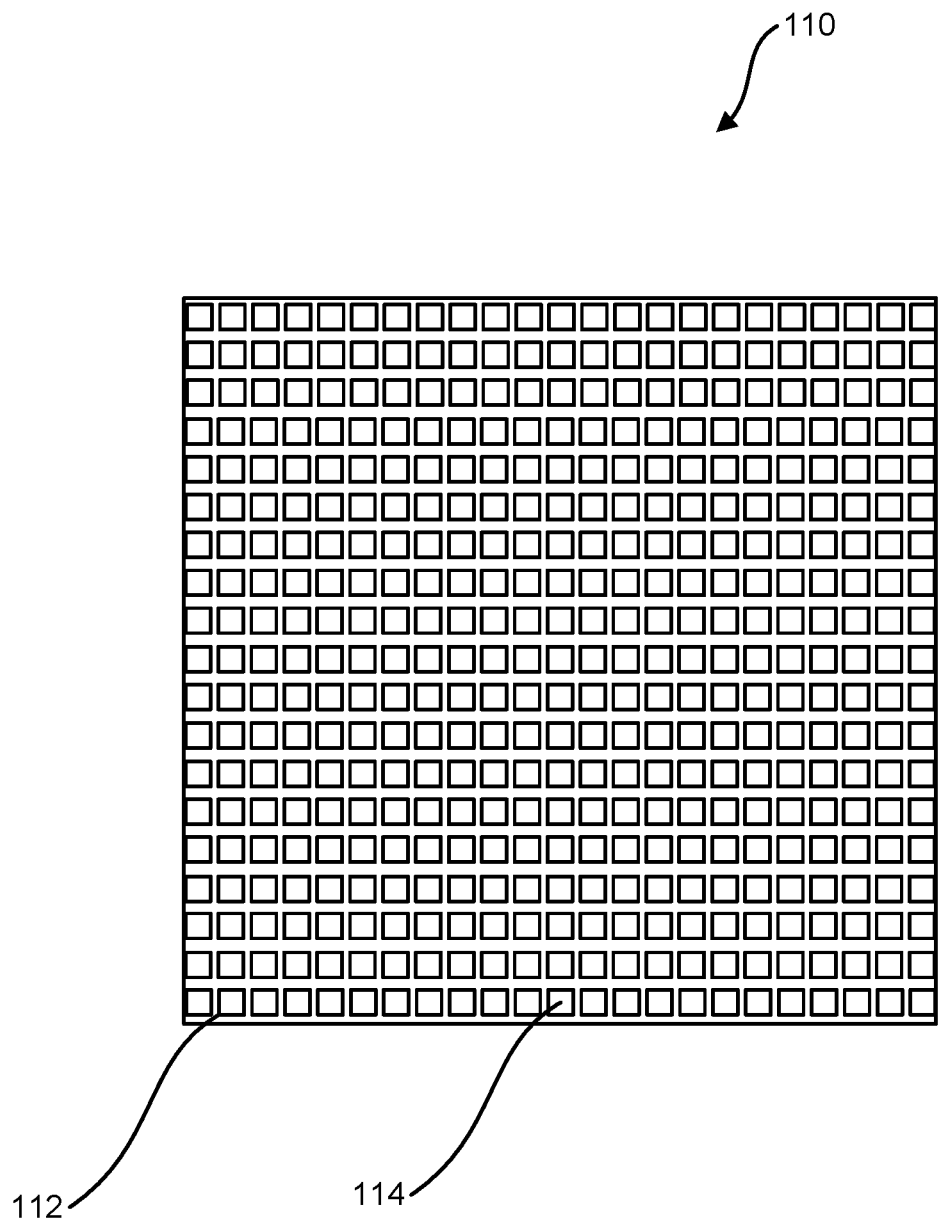
FIG. 7 is a top plan view of a porous marker wicking apparatus having rectangular vertical wicking posts, in accordance with one embodiment of the present disclosure.
Figure 8A:
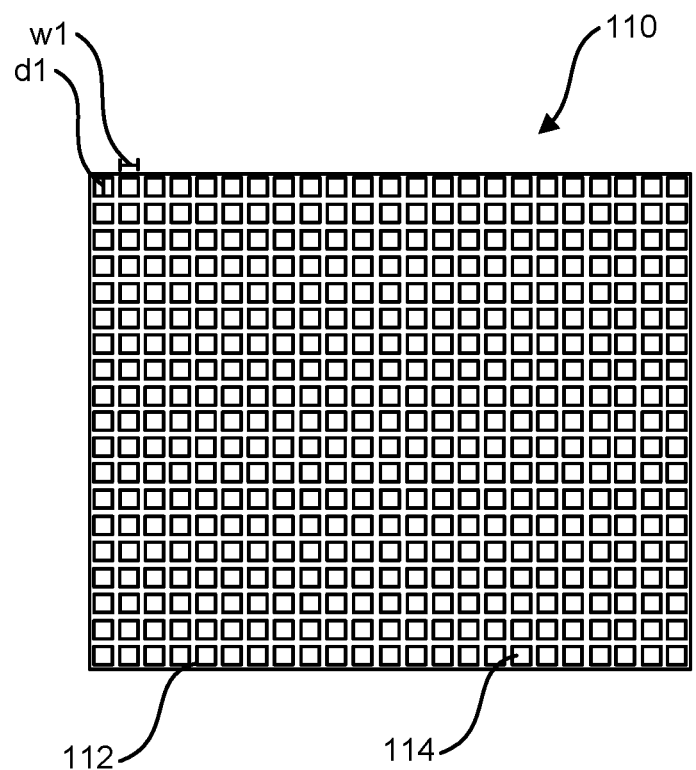
FIG. 8A depicts a top plan view of the porous marker wicking apparatus of FIG. 7.
Figure 8B:
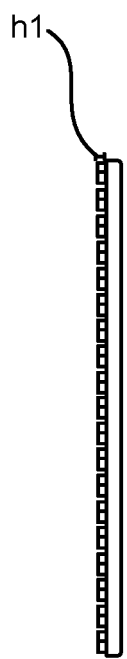
FIG. 8B depicts a side plan view of the porous marker wicking apparatus of FIG. 7.
Figure 10:
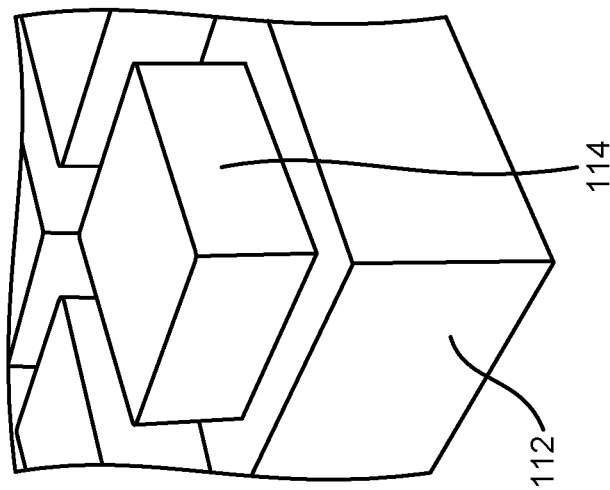
FIG. 10. is a perspective view of a vertical wicking post with rounded edges.
Figure 9:
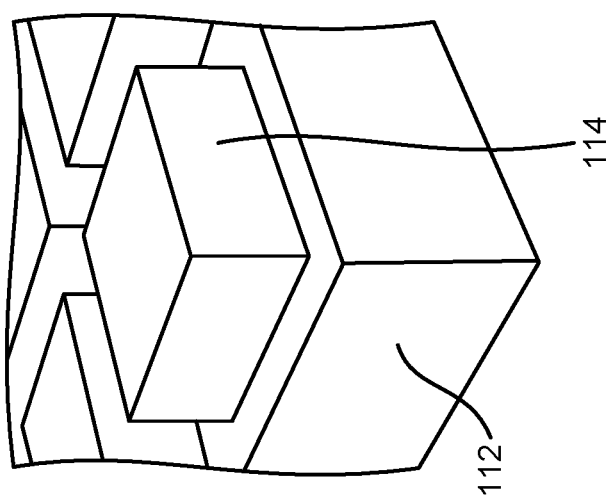
FIG. 9 is a perspective view of a vertical wicking post with sharp edges.

The present disclosure is related to a marker pixel wicking apparatus that allows a user to create dimensional pixelated art using a method of applying a colored ink marker directly onto the top white surface of a specifically designed substrate. The substrate has been molded specifically with an array of small vertical flat-topped cylinders covering nearly the entire surface. Any color marker nib is placed directly onto the cylinders' top surface to activate the ink transfer to create a colorful image. A user can select any desired colors and/or placement across the array of cylinders to create a colorful image. An unlimited amount of images can be created simply by arranging the colors across the array of white cylinders. The Pixel Art surface may be washable allowing repeated use if desired. Washing the surface using clean water removes any transferred color returning the surface to its original blank white color. The wicking substrate is typically molded or co-molded using two separate materials that will allow the protruding vertical cylinders to easily absorb the marker ink using a porous material. Selective laser sintering can also be used. This allows for brighter, more vibrant colors in the finished pixel art. The base layer below the cylinders is molded in a denser, less absorbing material to limit the spread of color, mitigating any color contamination.

In the embodiments of FIGS. 1-6, various views of the marker pixel wicking apparatus are shown. In some aspects, the substrate surface is a wicking, porous material similar to that of a marker nib. In further aspects, the pixel wicking substrate has a first porosity proximate the outer surface of the substrate, and a second porosity proximate the base plate, such that the flow of wicked ink into the contacted wicking substrate surfaces does not flow below the higher density, second porosity structure. As further shown in the examples of FIGS. 1-6, the staggered, honeycomb orientation of the individual "pixel" columnar segments of the porous substrate indicate individual components for coloring with a washable ink, such as a washable, water-based ink from a broadline marker. The base and/or frame structure may be configured to support the wicking porous substrate along one or more surfaces, such as the bottom surface along a solid panel parallel to the substrate, and a top surface perforated with openings corresponding to the individual pixel protrusions of the top surface of the wicking substrate.

Turning now to FIGS. 7-11, another embodiment of the marker pixel wicking apparatus is generally indicated at reference numeral 110. Wicking apparatus comprises a base 112 and a plurality of vertical wicking posts (protrusions) 114 extending upwardly along the upper surface of base 112. Vertical wicking posts 114 can be any desired shape, such as cylindrical (see FIGS. 2-6), rectangular (see FIGS. 7-11), or any other suitable shape known to those skilled in the art. That is, the cross-sectional shape of the vertical wicking post 114 can be a circle, square, rectangle, oval, star, heart, polygon, or any desired shape or combination thereof. In certain embodiments, wicking posts 114 can have a width w1 and/or depth d1 of less than about 0.2 inches (e.g., 0.15 inches), for example, from about 0.1 inches to about 0.2 inches, in some embodiments about 0.15 inches. In the embodiment shown in FIG. 8, the vertical wicking posts 114 have a square cross-section such that the width w1 and/or depth d1 are equal. In the exemplary embodiment shown in FIG. 10, the edges of wicking posts 114 are rounded. Alternatively, in the exemplary embodiment shown in FIG. 9, the edges of wicking posts 114 are sharp (i.e., not rounded).

In certain embodiments, wicking posts 114 can have a height h1 (measured from the top surface of the base 112 to the top surface of the wicking post 114 of from about 0.1 inches to about 0.2 inches, in some embodiments about 0.12 or about 0.15 inches. In various aspects, wicking posts 114 are uniformly spaced across base 112 to form evenly spaced columns and rows of wicking posts 114. Wicking posts 114 are also uniformly spaced from each other. In some embodiments the distance between wicking posts 114 can be less than about 0.1 inches, for example about 0.06 inches, or from about 0.03 inches to about 0.1 inches. The wicking posts 114 can generally comprise perimeter wicking posts 114a around the perimeter of the base 112 and central posts 114b in the center area of the base 112. Central posts 114b are generally separated from adjacent posts 114, whether a perimeter or another central post, by a first distance (e.g., the distances recited above). The distance between the perimeter posts 114a and the nearest edge(s) of the base 112 is about one half of the first distance. This allows for a combination of multiple apparatuses 110 without any visible gap between distinct panels.

A sufficient number of wicking posts 114 are included on base 112 to generally cover its surface area with the wicking posts 14 positioned substantially equally apart across the surface, the number of wicking posts 114 varying based on the size and dimensions of base 112. For example, in the embodiment shown in FIG. 8, the surface area of the base is approximately 20 inches (e.g., approximately 5 (4.83) inches by 4 (3.99) inches). In this embodiment, the base 112 includes 19 wicking posts 114 in a column orientation and 23 wicking posts 114 in a row orientation.

Figure 11:
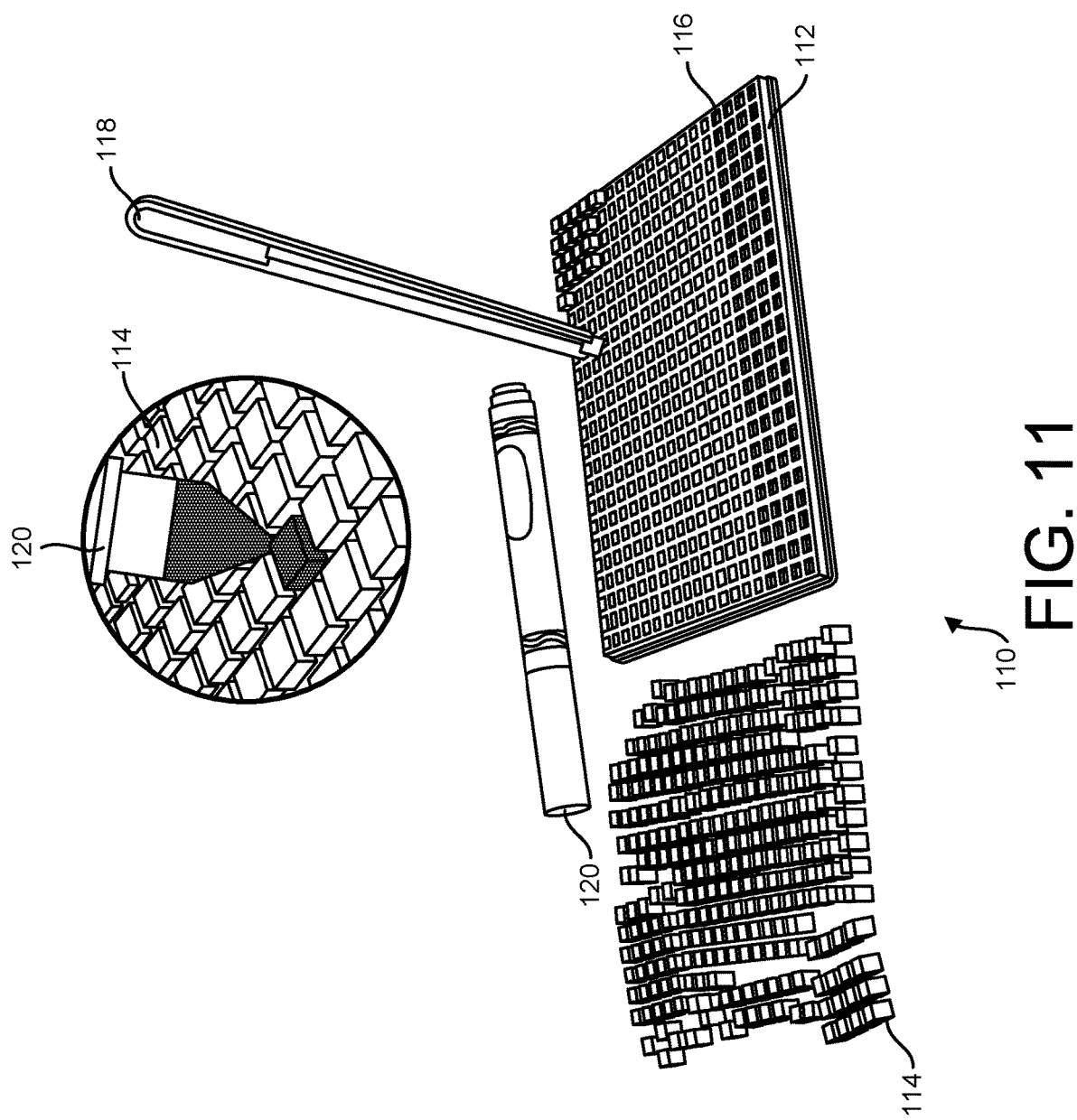
FIG. 11 is a perspective view of a porous marker wicking apparatus having removable rectangular vertical wicking posts in accordance with one embodiment of the present disclosure and illustrating use of tweezers to insert a vertical wicking post; and a close-up view of a marker coloring a vertical wicking post.

In another embodiment, and as shown in FIG. 11, wicking posts 114 can be removable from base 112. In this embodiment, base 112 includes a plurality of wells 116 sized and shaped to receive wicking posts 114. Wells 116 are deep enough to allow insertion and stable retention of the wicking posts 114 but do not fully encapsulate wicking posts 114. For example, wells 116 may be from about 0.05 inches to about 0.1 inches deep, such as 0.08 inches deep, compared to an overall height of individual wicking posts 114 measured from the base of the well 116 to the top surface of the wicking post 114 of from about 0.1 inches to about 0.3 inches (e.g., approximately 0.2 inches).

Wicking posts 114 are made of a substrate that is molded or co-molded using materials that allow the wicking posts 114 to absorb a donor solution (e.g., marker ink). The apparatus 110 itself can be formed by selective laser sintering, molding, or any other appropriate means known in the art. Thus, wicking posts 114 may be made from a porous and/or hydrophilic material to facilitate wicking or absorption of the donor solution. In contrast, base 112 is typically made of (molded in) a denser/less porous and/or hydrophobic material such as a molded plastic to inhibit the spread of the donor solution through base 112. Alternatively, both the base 112 and wicking posts 114 can be made from the same material. Typically, when this is the case, the base 112 is treated with a hydrophobic substance and/or the wicking posts 114 are treated with a hydrophilic substance. In various aspects, the porosity of the wicking posts 114 is higher than the porosity of the base 112. In some aspects, the porosity of the base 112 is increased in order to improve the washability of the apparatus 110. The increased porosity can be across the entire base 112 or only sections thereof (for example, the upper surface of base 112) in order to reduce flow of donor solution deeper into base 112, which in turn makes it easier to clean apparatus 110 and reduces the chance of donor solution leaching into the base 112 or reappearing in the base 112 after being washed. For example, the wicking posts 114 can have a porosity of from about 20 microns to about 40 microns. The porosity of the base 112 is less than or equal to the porosity of the wicking posts 114 and can be, for example, from about 0 microns to about 40 microns.

As shown in FIG. 11, the apparatus 110 may also be provided with a pair of tweezers 118 to allow a user to easily grasp the individual wicking posts 114 for placing them into and removing them from well 116. It may also optionally and independently be provided with one or more markers 120 to be used in coloring the wicking posts 114.

In some embodiments, one or more surfactants are incorporated in the top (surface) portion of wicking posts 114 in order to enhance absorption of the donor solution into the wicking posts. In these embodiments, repeated use and cleaning of the apparatus may cause the surfactants to be washed out of the wicking post 114. Additional surfactant to replenish the lost surfactant can be provided with the apparatus for adding to the top portion of wicking post 114. In various embodiments, additional surfactant is adding to the wicking posts 114 during standard washing with soap (e.g., dish soap), acting as the surfactant, and water. After use of the apparatus 110, the user can simply wash the apparatus 110 with soap and water, thereby washing away any color on the posts 114 and delivering additional surfactant to aid in the wicking action.

A delivery device or system could additionally be provided for evenly applying the additional surfactant such as via a brush, a dropper, or a surfactant marker. In various aspects, the additional surfactant is provided in a surfactant marker (e.g., a marker having a reservoir and a saturated nib comprising the surfactant). The surfactant can be replenished in the top of the wicking post 114 by contacting the marker nib with the wicking post for a sufficient amount of time to saturate the top surface of the wicking post with surfactant. In other embodiments, the top portion of wicking posts 114 may not originally contain a surfactant solution, but optionally, the user can apply surfactant solution if desired to wicking posts 114 in the manner described above.

In various embodiments, more than one pixel wicking apparatus 110 can be combined to create a larger drawing surface. Any desired number of pixel wicking apparatuses 110 can be placed side-by-side to enlarge the drawing surface. The pixel wicking apparatuses 110 can be joined by any appropriate method known in the art. For example, multiple pixel wicking apparatuses 110 can be joined by adhering an adhesive sheet to the underside (i.e., bottom) of the bases of the apparatuses 110. Wicking apparatuses 110 can also be joined using fusable plastic beads placed on the bottom face of the apparatuses 110 (either across the majority of the surface area of the bottom face or on joining edges) and fused together using heat, water, or any other appropriate means. Wicking apparatuses 110 can also be placed side-by-side on a substrate and secured by any known means to said substrate using, for example, adhesive (glue dots, glue, hot glue, tape, hook and loop-type fasteners etc.).

The wicking apparatus 110 can also be treated with a protectant that provides UV protection, fading or ink transfer protection (e.g., a fixative), or any other desired characteristic. The protectant can be in a spray, liquid, or solid form. A fixative seals in the image created on the wicking apparatus by closing the open pores of the wicking posts. The fixative can be a resin, spray, or any other suitable substance and application method known in the art.

Thus, provided herein is a method of drawing using the pixel wicking apparatus. A user places a donor solution source (e.g., a saturated marker nib) onto the top surface of at least one vertical wicking posts for a sufficient amount of time to saturate the top surface of the vertical wicking post with the donor solution. This step can be repeated any desired number of times on different vertical wicking posts and with different donor solution sources (e.g., saturated marker nibs of differing ink colors) to produce any desired image. In various embodiments, when the drawing is completed, the user can seal the drawing using a fixative in order to create a waterproof barrier and/or reduce the fading of ink. Without the fixative in place, the donor solution can be washed from the vertical wicking posts to create a clean, uncolored drawing surface. Washing with clean water removes any transferred donor solution to return the vertical wicking posts to their original color (e.g., white) for re-use in creating a new pixel artwork.

Figure 12A:
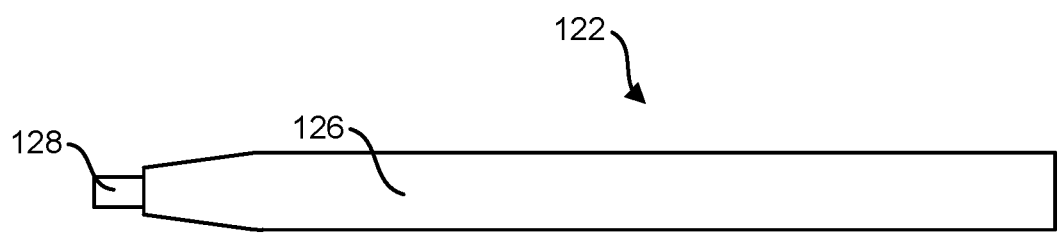
FIG. 12A is a side view of an eraser tool in accordance with one embodiment of the present disclosure.
Figure 12B:
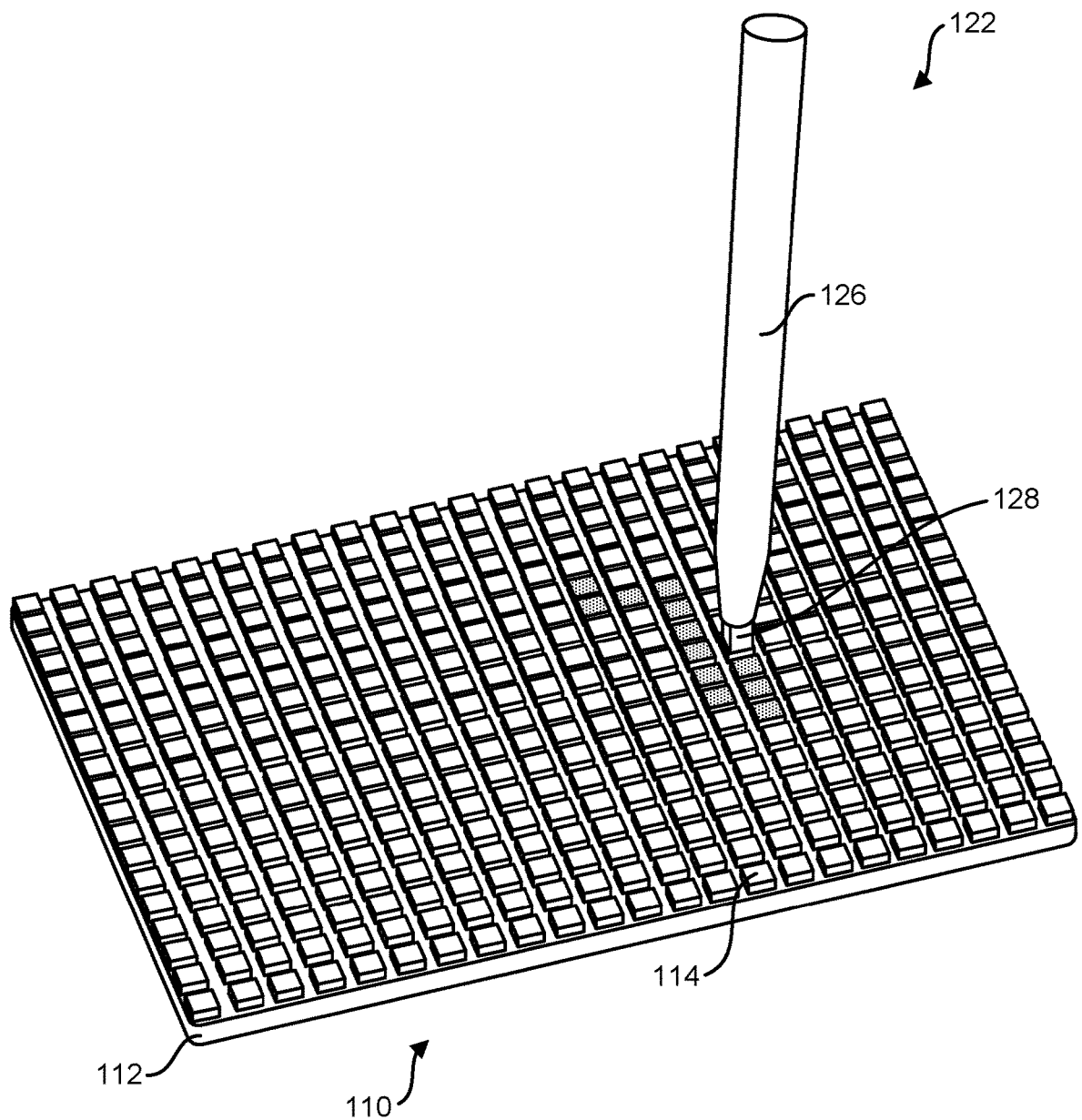
FIG. 12B is a perspective view of the porous marker wicking apparatus of FIG. 7 with a sponge eraser tool in accordance with one embodiment of the present disclosure.
Figure 12C:
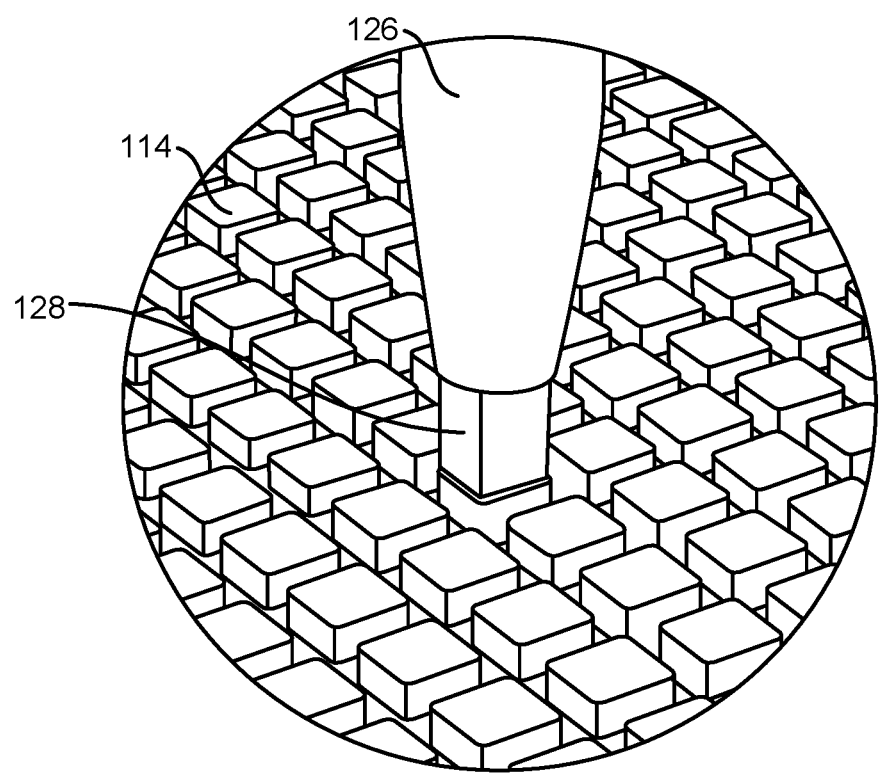
FIG. 12C is a close-up of the eraser tool erasing color from a vertical wicking post.

Turning now to FIG. 12, also provided herein is a sponge eraser tool 122 for use with the pixel wicking apparatus 110. As illustrated, the eraser 122 comprises an absorbent sponge 128 having the same geometry (e.g., same cross-sectional dimensions) as the individual vertical wicking posts 114. For example, in embodiments where the vertical wicking posts 114 are cylindrical, the sponge 128 will have a circular cross-section that is the same diameter as the vertical wicking posts 114. In other embodiments where the vertical wicking posts 114 are square or rectangular, the sponge 128 will have a square or rectangular cross-section that has the same width and depth as the vertical wicking post 114. In general, the absorbent sponge 128 is made from a material that has a greater absorbency than that of the wicking post's 114 porous material. For example, in some aspects, the sponge 128 may be made from polyvinyl alcohol (PVOH) or cellulose. The absorbent sponge can be partially inserted into a barrel 126 for ease of use, such that one end of the sponge 128 in secured within the barrel 126 and an opposite end of the sponge 128 is exposed for use.

In some embodiments, pixel wicking apparatus 110 can be provided with and/or used in conjunction with pixel templates that serve as guides to assist the user in creating specific artwork images. For example, the pixel templates may be provided in the form of printed sheets of paper where a top view of the pixel wicking apparatus is printed on each sheet displaying the tops of the vertical wicking posts. Each template may have a different image (e.g. design or picture) printed on it wherein the image is created by the specific arrangement of colored vertical posts on the sheet. This template may identify different colors to be used in creating the image, and may identify the specific position/location of each vertical wicking post that is colored to create the design or picture with reference to a reference number or other position locator. In other embodiments, the pixel templates may be provided in electronic form such as by accessing the templates on-line via a website. In this embodiment, a library of different images can be made available for user selection, wherein the user can select the desired image and then print or display the template for that image on a screen for use as a guide in making a similar image with the pixel wicking apparatus. In other embodiments, custom templates may be made by or for the user that provide a guide for making a specific image that the user desires to create. For example, a custom template may be made by using a software application that functions to receive an image (such as by uploading a scanned drawing or photograph) and converts or translates that image into a pixelated map. In this way, a user can recreate a desired image with the map produced by the software. The pixelated map can also indicate appropriate marker colors to recreate the image. The software may also generate a guide to provide the user the ability to translate the image to specific marker colors. The pixelated map and/or the guide may be printed by the user or referenced on-line for use in creating the image with the pixel wicking apparatus. Thus, a user uploads an image desired to be recreated in pixel art to the software. The user then crops and fits the image to the size of base of the pixel wicking apparatus. Once this step is complete, the software creates a guide that can be optionally printed by the user or viewed on screen. The guide provides codes and colors to match available markers and indicates which wicking post receives which color to recreate the uploaded image.

Figure 13:
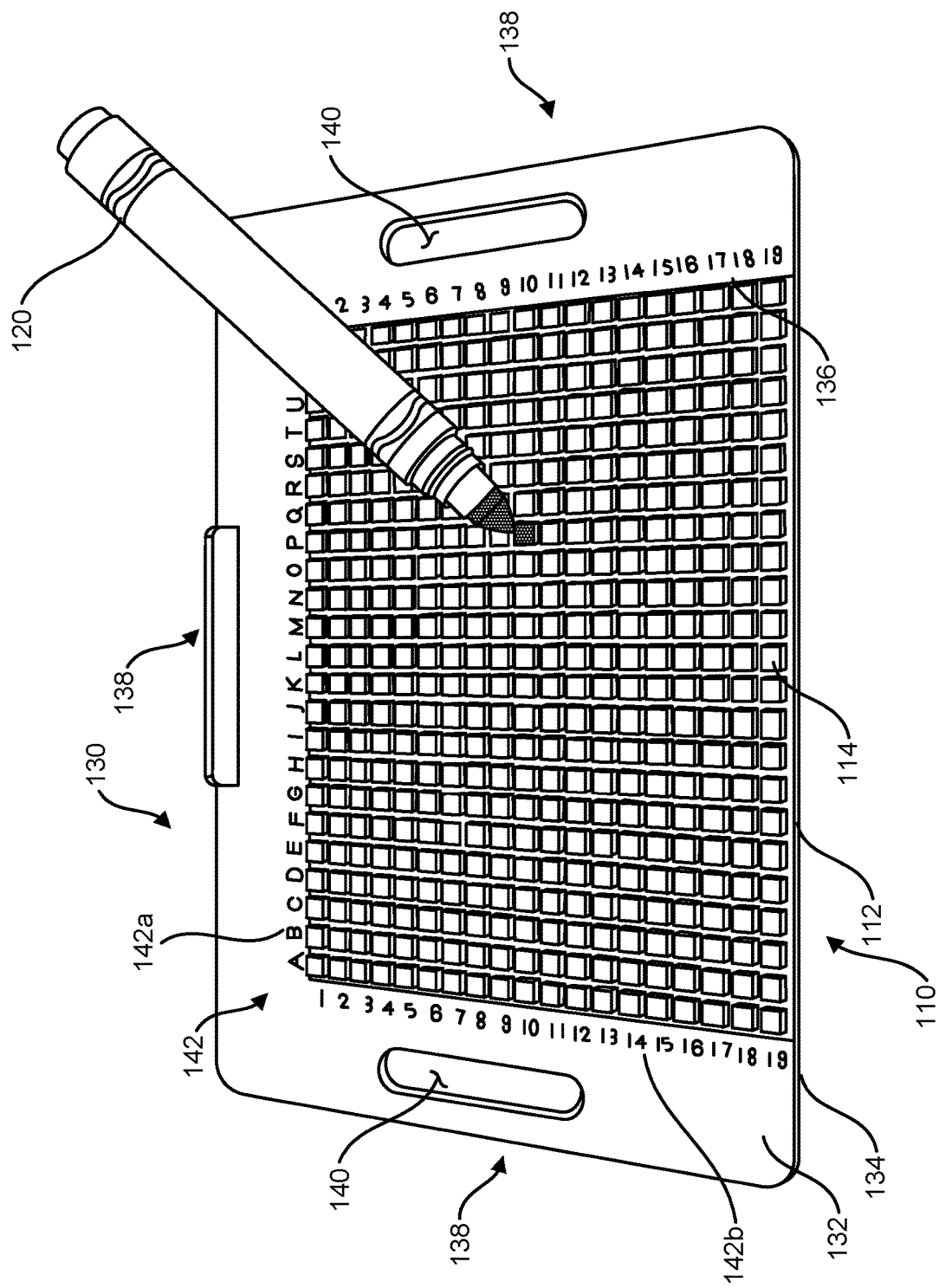
FIG. 13 is a perspective view of the porous marker wicking apparatus of FIG. 7 with an art guide with handles in accordance with one embodiment of the present disclosure and illustrating use of a marker to color a vertical wicking post.
Figure 14:
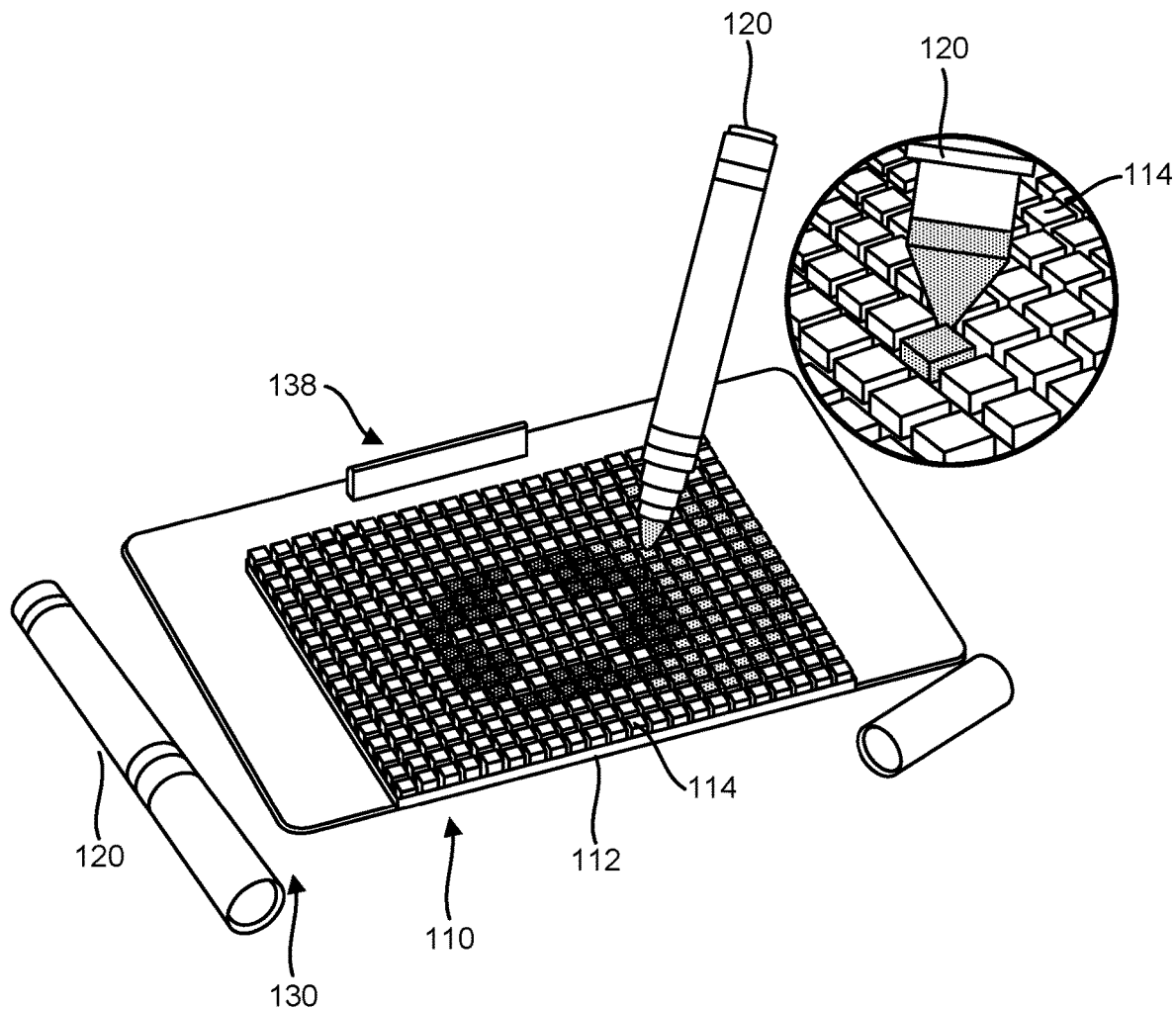
FIG. 14 is a perspective view of the porous marker wicking apparatus of FIG. 7 with an art guide without handles in accordance with one embodiment of the present disclosure and illustrating use of a marker to color a vertical wicking post; a close-up view of the marker coloring a vertical wicking post; and a top plan view showing the pixel art that is created on the porous marker wicking apparatus.
Figure 15A:
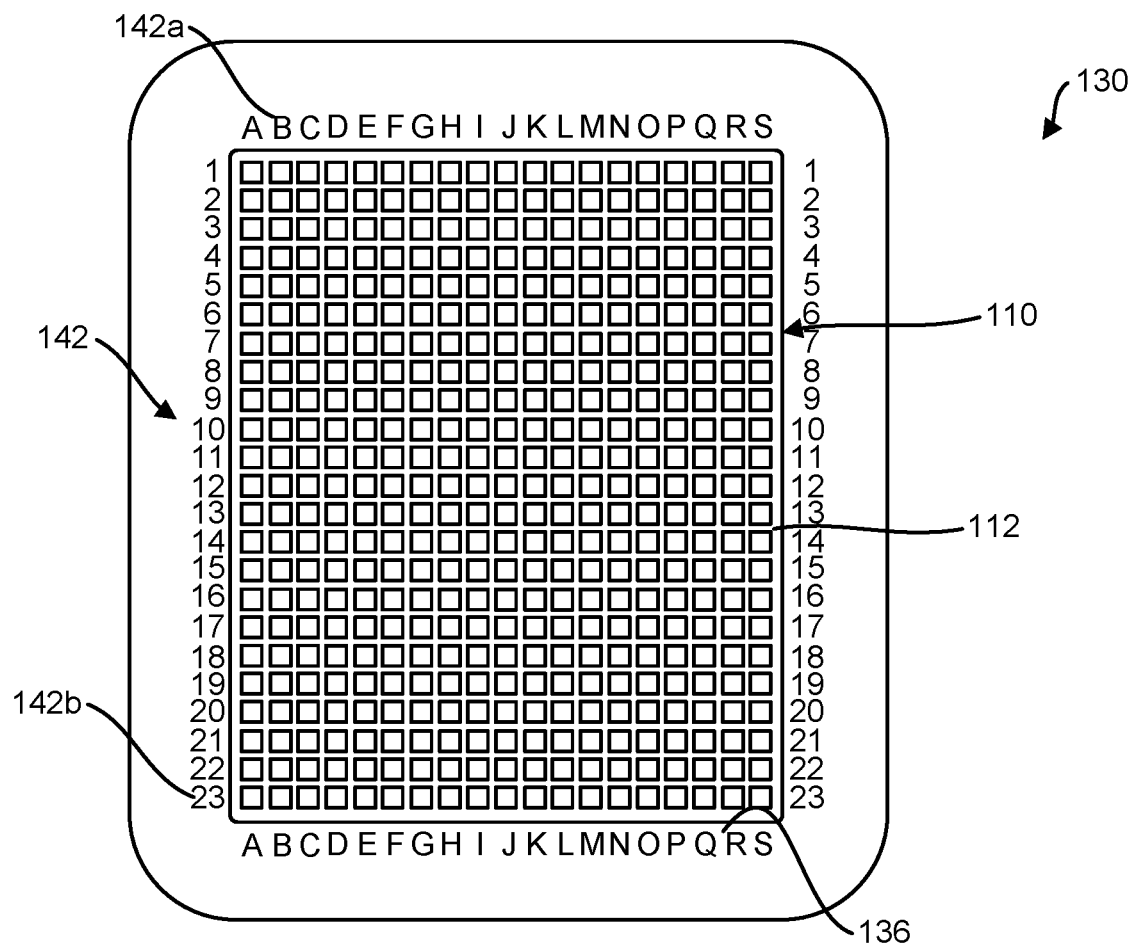
FIG. 15A is a top plan view of the porous marker wicking apparatus of FIG. 7 with an art guide without handles and having a central opening for the wicking apparatus in portrait orientation.
Figure 15B:
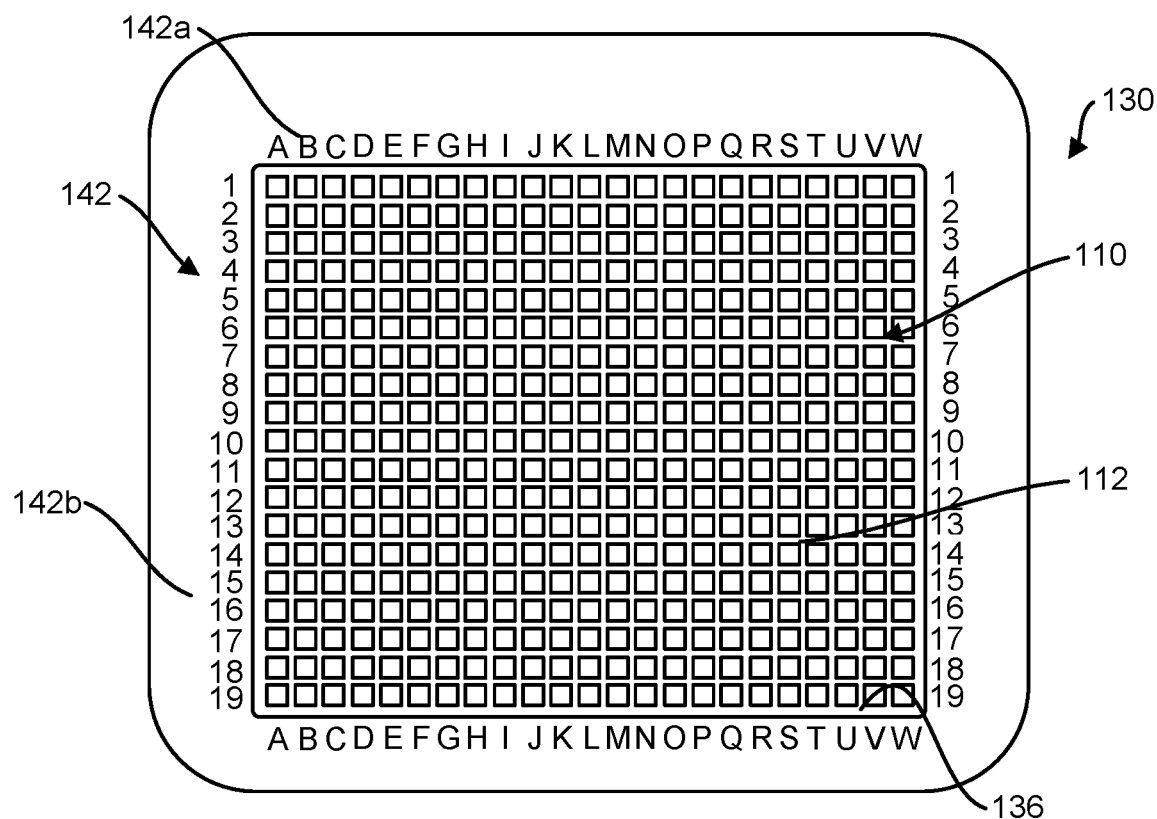
FIG. 15B is a top plan view of the porous marker wicking apparatus of FIG. 7 with an art guide without handles and having a central opening for the wicking apparatus in landscape orientation.

Turning now to FIGS. 13 and 14, another aspect of the present disclosure is an art guide generally indicated at reference numeral 130. The art guide 130 comprises a base 132 having an opening 136 sized and shaped to receive the base 112 of the pixel wicking apparatus 110. In the embodiment illustrated in FIGS. 13 and 14, the opening 136 comprises a slot on one outside edge 134 of the base 132 (e.g., the lower edge). In other embodiments, such as those illustrated in FIGS. 15A and 15B, the opening 136 can be located in a central portion of the base 132 such that the perimeter of the opening 136 abuts the outer perimeter of the base 112 of the pixel wicking apparatus 110. In embodiments where the height and width dimensions of the apparatus 110 differ, the art guide 130 can be in a portrait orientation (FIG. 15A), a landscape orientation (FIG. 15B), or interchangeable. In various embodiments, the art guide 130 can also include at least one handle 138. In the illustrated embodiment, the base 132 defines two openings 140 on opposing sides that comprise two handles 138. Another handle 138 is located near the top edge of base 132 in the illustrated embodiment. The top edge handle 138 protrudes from base 132, allowing a user to easily pick up the art guide 130 from a flat surface. The base 132 also includes pixel indicia 142, such that each row and/or column of vertical wicking posts is individually indicated. For example, in the illustrated embodiment, each column of vertical wicking posts is marked by a distinct letter 142a and each row of vertical wicking posts is marked by a distinct number 142b, although it will be understood that any number of identification systems can be used. In some aspects, the art guide 130 is used in conjunction with the above-described pixel template (printed, on-line or custom pixelated map and guide), where the pixel template provides a color for an indicated vertical wicking post 114 using the art guide indicia (e.g., A1 in the illustrated embodiment), providing a user reference points to recreate a desired image.

Figure 16A:
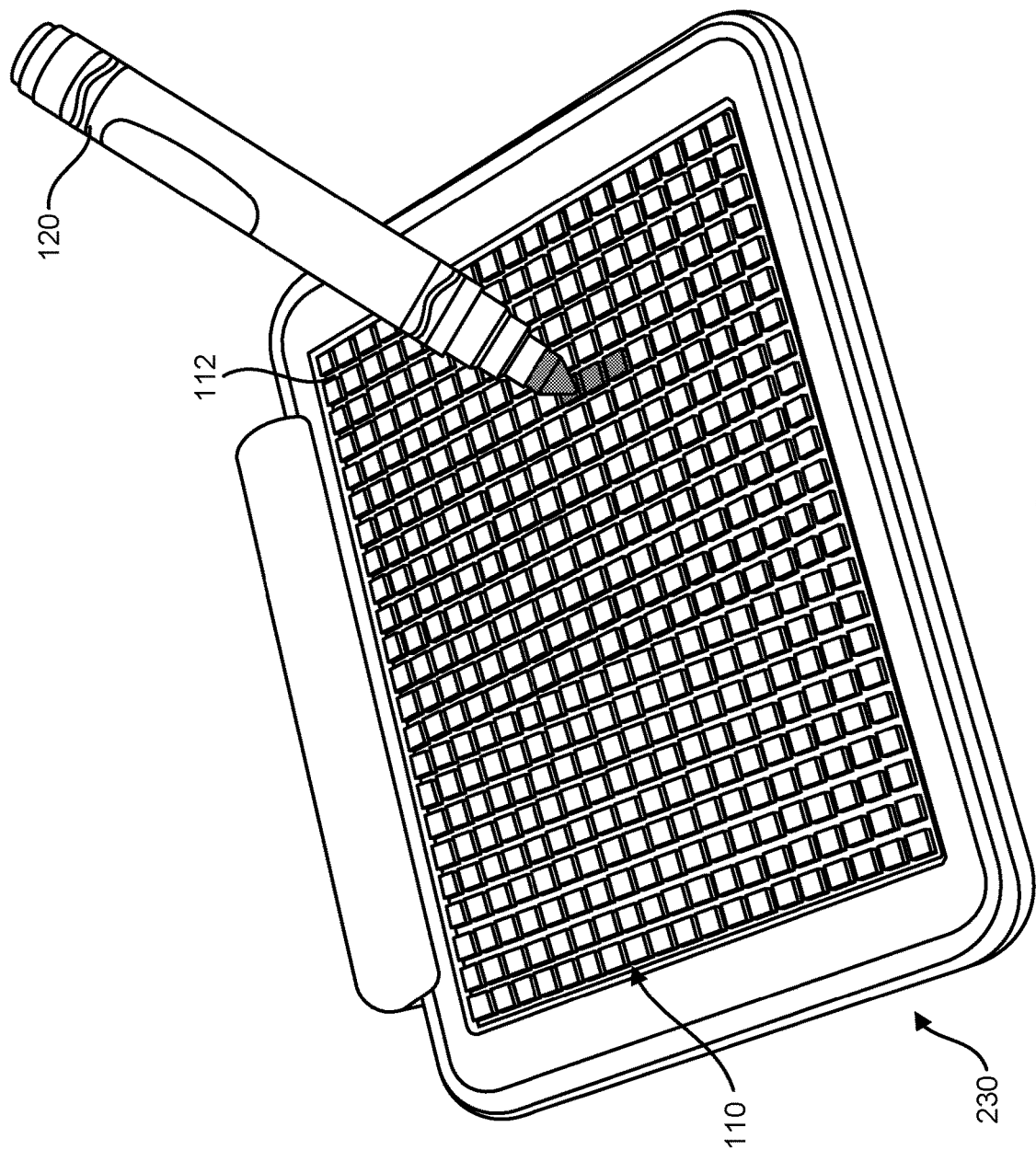
FIG. 16A is a perspective view of the porous marker wicking apparatus of FIG. 7 with a light board.
Figure 16B:
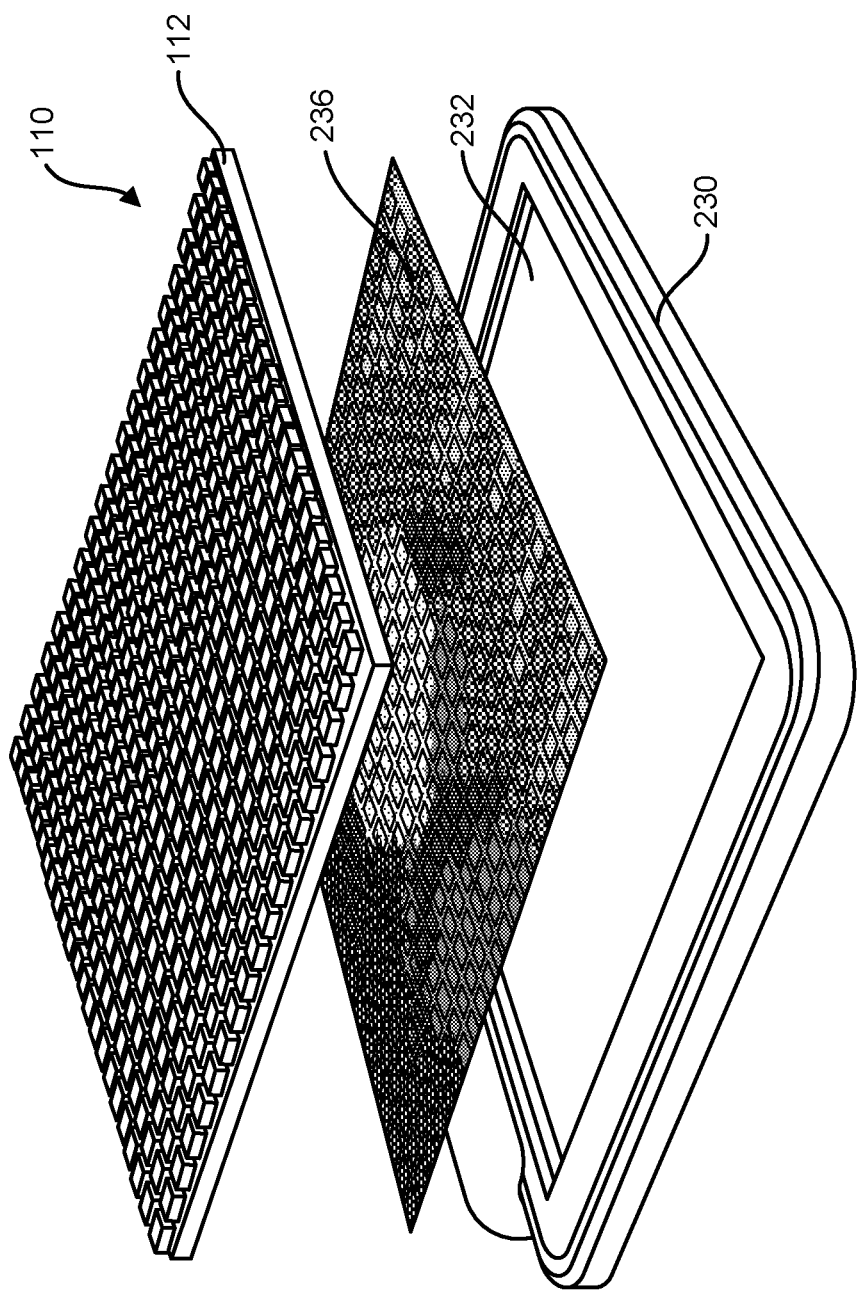
FIG. 16B is an exploded perspective view of the light board and porous marker wicking apparatus of FIG. 16A
Figure 16C:
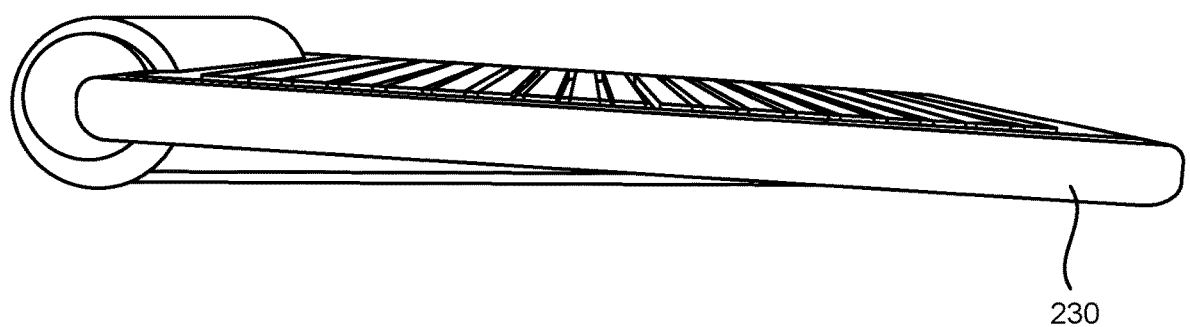
FIG. 16C is a side view of the porous marker wicking apparatus and light board of FIG. 16A.

Turning now to FIGS. 16A to 16C, also provided herein is a light-board pixel system generally indicated at reference numeral 230. The light-board generally comprises a drawing surface 232 and a light source (not shown) operable to emit light. The drawing surface 232 can comprise a transparent or translucent sheet-like large surface area optical waveguide to mix the wavelengths of light emitted from light emitting diodes (LEDs) to uniformly illuminate the drawing surface with the light. The LEDs can be edge-mounted. The light-board also contains a power switch that supplies power to the LEDs when in the "on" position. In operation, a user places an image (or image guide) 236 she wishes to recreate on top of the light board, with the light board in the "on" position. Then, a wicking apparatus 110 can be placed on top. It is generally preferable for the wicking apparatus base to have a transparent or semi-transparent base 112 when used in this application. In this way, the user can see the color of the picture surrounding the pixel illuminated through the apparatus base by way of the light board and determine appropriate colors to use in order to recreate the picture.

Figure 17:
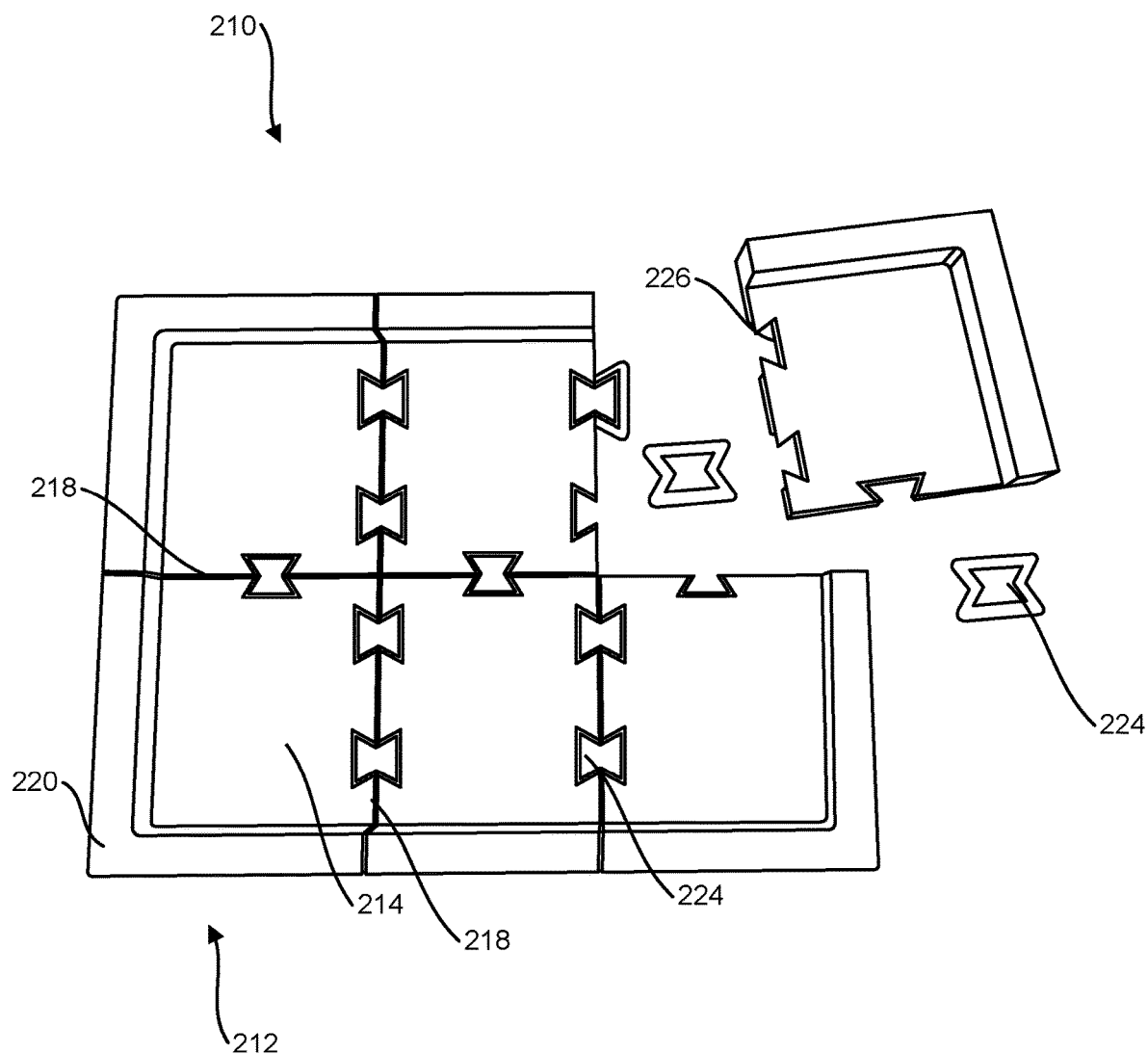
FIG. 17 is a top plan view of a modular frame for use with a porous marker wicking apparatus in accordance with one embodiment of the present disclosure.

Turning now to FIG. 17, also provided herein is a modular frame generally indicated at reference numeral 210. Modular frame 210 comprises a plurality of modular panels 212. Modular panels 212 comprise a base portion 214 having at least one joining edge 218 and optionally, a framing portion 220. The framing portion 220 is raised and is located at the perimeter of the modular panel 212. The presence or absence of a raised edge (framing portion 220) is determined by the panel's 212 anticipated location in the assembled modular frame 210. For example, a panel 212 anticipated to be located at the corner of the frame 210 will have two raised edges at the corner of the assembled frame 210, a panel 212 located at a non-corner perimeter will have one raised edge at the edge of the assembled frame 210, and a panel 212 located in a central non-perimeter location will have no raised edges. Modular panels 212 can be joined by any means known in the art. In the illustrated example, modular panels are joined via a mating connection using a mating piece 224. In this way, each modular panel has at least one cut-out 226 on each joining edge 218. A mating piece 224 is inserted at the aligned cut-outs 226 of the two modular panels 212 to secure the modular panels 212 together. In this way, mating piece 224 is sized and shaped to be received within the aligned cut-outs 226 of two modular panels 212. Once the full modular frame 210 is assembled, a pixel wicking apparatus (or multiple pixel wicking apparatuses, as desired) can be placed within the frame 210. A mat can also be placed around the wicking apparatuses. In other embodiments, a standard frame can also be used.

Various kits including components described herein are also envisioned by the present disclosure. For example, a first kit includes at least one wicking apparatus as described herein (e.g., one, two, three, four, etc.) and at least one marker for use with the apparatus (e.g., at least two, at least five, etc.). The kit may also include a sponge eraser tool, adhesive, modular framing components, art guides, and inspiration or guide pictures to assist a user in creating a design. The kit illustrated in FIG. 18 contains a plurality of wicking apparatuses 110 (e.g., two, four, or six wicking apparatuses), a plurality of writing instruments 120, more specifically markers, an art guide 130, an adhesive component 180, an image guide 182, and matte framing 184. In the illustrated embodiment, the matte framing comprises single sheet of substrate having perforations or other guides thereon that allow a user to punch out the desired size of framing. The kit may include some or all of these components, or additional components as necessary.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including"

and "having" are intended to be inclusive and mean that there may be additional elements other than the listed elements.

In view of the above, it will be seen that the several objects of the invention are achieved, and other advantageous results attained.

As various changes could be made in the above products and methods without departing from the scope of the invention, it is intended that all matter contained in the above description and shown in the accompanying drawings shall be interpreted as illustrative and not in a limiting sense.

The invention claimed is:

1. A kit for creating pixel artwork or designs, the kit comprising:
   a marker wicking apparatus comprising:
   a planar base;
   a plurality of wicking protrusions extending outward from the planar base, the plurality of wicking protrusions comprising a wicking surface;
   and
   wherein a wicking ability of the planar base is less than a wicking ability of the plurality of wicking protrusions; and
   at least one template, the at least one template displaying an image that can be recreated on the marker wicking apparatus by coloring a specific arrangement of one or more of the plurality of wicking protrusions, the template identifying a specific position and a specific color for each of the one or more of the plurality of wicking protrusions to be colored to recreate the image.

2. The kit of claim 1, wherein each of the plurality of wicking protrusions has a cross-sectional shape of a circle, a square, a rectangle, an oval, a star, a heart, a polygon, or a combination thereof.

3. The kit of claim 1, wherein each of the plurality of wicking protrusions is oriented generally perpendicular to the planar base.

4. The kit of claim 1, wherein the porosity of the planar base is less than the porosity of the plurality of wicking protrusions.

5. The kit of claim 1, wherein each of the plurality of wicking protrusions is coated or saturated with a surfactant on the wicking surface.

6. The kit of claim 1, wherein a top surface of each of the plurality of wicking protrusions comprises the at least one wicking surface, and the top surface is generally planar and parallel to the planar base.

7. The kit of claim 1, wherein the planar base and the plurality of wicking protrusions are integrally molded.

8. The kit of claim 1, wherein the plurality of wicking protrusions are releasably coupled to the planar base.

9. The kit of claim 8, wherein the planar base defines at least one well sized and shaped to releasably receive the plurality of wicking protrusions.

10. The kit of claim 1, wherein the plurality of wicking protrusions comprises at least about 10, at least about 20, at least about 30, at least about 50, at least about 100, or at least about 200 wicking protrusions.

11. The kit of claim 10, wherein the wicking protrusions are evenly spaced and distributed on the planar base.

12. The kit of claim 11, wherein the plurality of wicking protrusions comprises perimeter protrusions located around the perimeter of the apparatus and central protrusions, wherein the central protrusions are spaced a first distance from an adjacent perimeter protrusion or adjacent central protrusion, and wherein the perimeter protrusions are spaced half of the first distance from an edge of the planar base.

13. The kit of claim 1, wherein each of the plurality of wicking protrusions has a porosity of from about 20 microns to about 40 microns.

14. The kit of claim 13, wherein the planar base has a porosity equal to or less than the porosity of each of the plurality of wicking protrusions.

15. The kit of claim 1, further comprising at least one writing instrument containing a donor solution configured to wick in at least one of the plurality of wicking protrusions.

16. The kit of claim 15, wherein the at least one writing instrument is at least one marker.

17. The kit of claim 1 further comprising an art guide, the art guide comprising a planar base, the planar base defining an opening thereon sized and shaped to receive the planar base of the marker wicking apparatus, wherein the planar base includes indicia configured to identify one wicking protrusion or a group of wicking protrusions of the plurality of wicking protrusions.

18. The kit of claim 17, wherein the indicia comprise column indicia and row indicia, wherein the column indicia are spaced near a horizontal edge of the opening and are configured to indicate to a user which column a wicking protrusion is in, and wherein the vertical indicia are spaced near a vertical edge of the opening and are configured to indicate to a user which row a wicking protrusion is in.

19. The kit of claim 1, wherein the base is formed from a hydrophobic material and the plurality of wicking protrusions are formed from a hydrophilic material.

20. The kit of claim 1, wherein the base and the plurality of wicking protrusions are formed from the same material.

21. The kit of claim 20, wherein the plurality of wicking protrusions have a higher porosity than the base.

22. The kit of claim 20, wherein the base is treated with a hydrophobic substance.

23. The kit of claim 20, wherein the plurality of wicking protrusions are treated with a hydrophilic substance.

* * * * *